M. Hayden.
Seeding-Machine.
N° 73973. Patented Feb. 4, 1868.
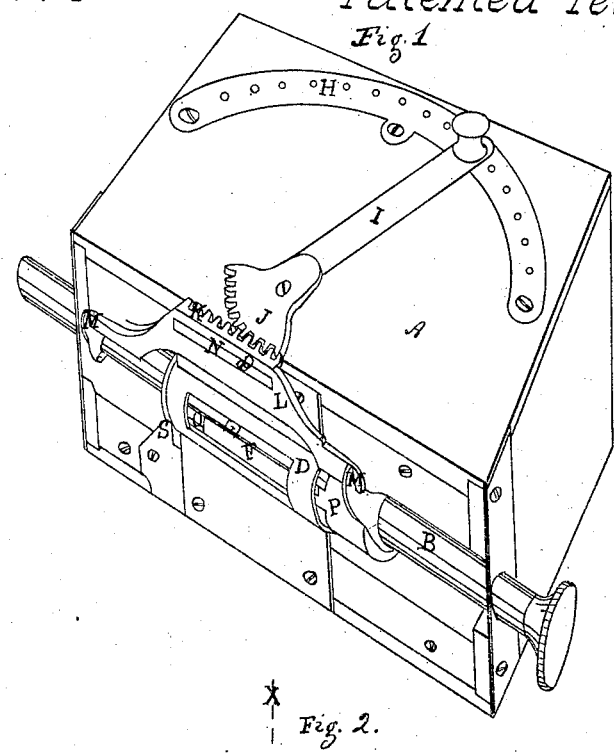
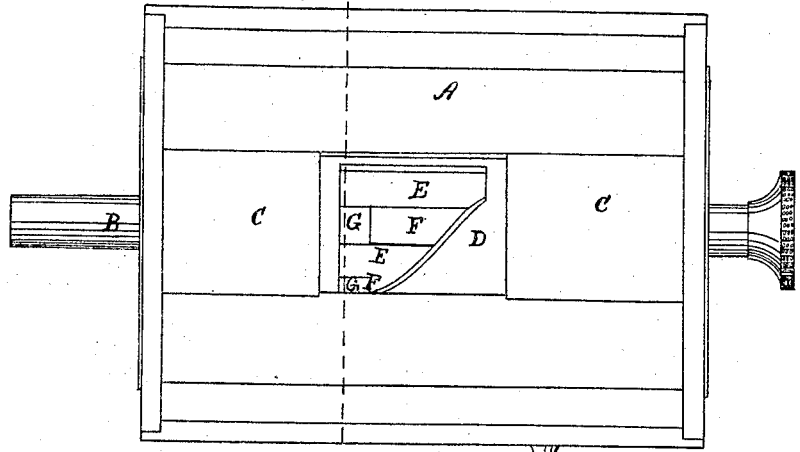
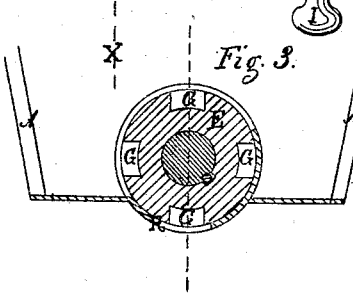
WITNESSES  
INVENTOR  
Martin Hayden  
by his atty  
Thos. S. Sprague

United States Patent Office.

MARTIN HAYDEN, OF DETROIT, MICHIGAN.

Letters Patent No. 73,973, dated February 4, 1868.

---

IMPROVEMENT IN SEEDING-MACHINES.

---

*The Schedule referred to in these Letters Patent and making part of the same.*

---

TO WHOM IT MAY CONCERN:

Be it known that I, MARTIN HAYDEN, of Detroit, in the county of Wayne, and State of Michigan, have invented a new and useful Improvement in Seeding-Machine, to be used for all kinds of seed, and with or without a cultivator or drill; and I do hereby declare that the following is a true and exact description of the same, reference being had to the accompanying drawings, and to the letters of reference marked thereon, and making a part of this specification.

Figure 1 is a perspective view, showing the front and bottom of my invention.

Figure 2 is a view of the interior and bottom of the seed-box or hopper.

Figure 3 is a vertical sectional view of the cylinder and attachments upon the line $x\ x$.

The object of my invention is so to construct a seeding-machine that it can be more readily gauged to suit the kind and quantity of seed desired to be sown upon a given surface, as, by my invention, the smallest as well as the greatest quantity required may be evenly distributed.

I will now proceed to describe the method of manufacturing my invention, so that those skilled in the art can readily build the same, especial reference being had to the drawings.

I first make the hopper or seed-box A, of any desired capacity, fastening upon the bottom thereof the convex cap C. Beneath the cap C, I place the revolving shaft B, and attach the same to the hopper or seed-box at the ends thereof, by any suitable device. Upon the shaft B, I place the grooved cylinder E, and fasten it to the shaft by keys or otherwise, so that the shaft and cylinder will revolve together. Then I slip on to the shaft the collar P, provided with gauge-prongs F, which fit and work in the grooves G in the cylinder E. Around this cylinder I place the sleeve D, with a rectangular opening in the bottom, as shown in fig. 1, and an inclined opening, as shown in fig. 2, in the top. The rectangular opening is for the delivery of the seed, while the inclined opening acts as a "strike" to the grooves G, and prevents the possibility of delivering any more seed than is required. The lower point of the inclined opening should be connected with the corresponding corner of the rectangular opening, by a small slot, R, to prevent crushing or bruising any seed that may be caught at that point. L is a plate, provided with arms M, which catch upon the shaft B, by which to govern the position of the gauge-prongs F. This plate is attached to the bottom of the hopper by a proper button or screw, O, which works in the slot N, to allow the plate to move forward or back, as occasion may require. The plate is also provided with a rack, K, into the teeth of which mesh the teeth of the segment-rack J, which is attached to the lever I, which is provided with a suitable pin, by which its position is fixed by dropping into the holes or notches in the quadrant H. This adjusting-apparatus is very simple, and consists in moving the lever I, and dropping the pin attached thereto into any one of the holes or notches in the quadrant, by means of which the gauge-prongs are made to advance or recede in the grooves in the cylinder, and govern the amount of seed to be delivered. The holes or notches in the quadrant should be so marked as to indicate the quantity of seed required. The shaft B may be made to revolve by any appropriate device. Another object in making the inclined opening in the top of the sleeve is, that while "striking," it does it with a drawing stroke, and consequently does not injure the seed. The cylinder is so constructed and attached to the shaft that it not only revolves with the shaft, but the shaft is allowed to slide horizontally through the cylinder, while the cylinder is held in its proper position relative to the openings in the sleeve, by a flange, S.

The same letters indicate like parts in each figure.

What I claim as my invention, and desire to secure by Letters Patent, is—

1. The construction of a seeding-machine, provided with the shaft B, the grooved cylinder E, the collar P, provided with the gauge-prongs F, and the sleeve D, when constructed and operating substantially as hereinbefore described.

2. The quadrant H, the lever I, the segment-rack J, and the plate L, when attached and operating substantially as and for the purposes set forth.

3. The combination of all the foregoing-described parts, in conjunction with the hopper or seed-box A, when constructed and operating substantially as and for the purposes specified.

MARTIN HAYDEN.

Witnesses:
H. G. HANNAMAN,
JAS. LAIDLAW.